(12) United States Patent
Wight et al.

(10) Patent No.: US 12,484,878 B2
(45) Date of Patent: Dec. 2, 2025

(54) ACOUSTIC WINDOW WITH COMPOUND SHAPE FOR ULTRASOUND PROBE

(71) Applicant: KONINKLIJKE PHILIPS N.V., Eindhoven (NL)

(72) Inventors: Michael J. Wight, Stoneham, MA (US); John Bench Caswell, Manchester, NH (US); Dino Francesco Cuscuna, Reading, MA (US); Kathryn Therese Jinks, Lynnfield, MA (US); Michael Eugene Peszynski, Newburyport, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 121 days.

(21) Appl. No.: 17/617,385

(22) PCT Filed: Jun. 11, 2020

(86) PCT No.: PCT/EP2020/066223
§ 371 (c)(1),
(2) Date: Dec. 8, 2021

(87) PCT Pub. No.: WO2020/249685
PCT Pub. Date: Dec. 17, 2020

(65) Prior Publication Data
US 2022/0240893 A1    Aug. 4, 2022

Related U.S. Application Data

(60) Provisional application No. 62/860,291, filed on Jun. 12, 2019.

(51) Int. Cl.
A61B 8/00    (2006.01)

(52) U.S. Cl.
CPC ......... *A61B 8/4272* (2013.01); *A61B 8/4444* (2013.01); *A61B 8/4455* (2013.01);
(Continued)

(58) Field of Classification Search
CPC ... A61B 8/4272; A61B 8/4444; A61B 8/4455; A61B 8/4488; A61B 8/4281; A61B 8/4405
See application file for complete search history.

(56) References Cited

U.S. PATENT DOCUMENTS 4,181,120 A * 1/1980 Kunii ................... A61B 8/4281
                                                                73/620
4,387,720 A * 6/1983 Miller .................. A61B 8/4281
                                                                73/644
(Continued)

FOREIGN PATENT DOCUMENTS

CN   104068891 A  * 10/2014  .......... A61B 8/4281
CN   102740777 B  * 11/2015  .......... A61B 8/4405
(Continued)

OTHER PUBLICATIONS

Machine-generated English translation of DE-3722943-A1 (Year: 2024).*

(Continued)

*Primary Examiner* — Pascal M Bui Pho
*Assistant Examiner* — Taylor Deutsch

(57) ABSTRACT

An ultrasound probe includes a housing configured to be grasped by a user, a transducer array coupled to the housing and configured to obtain ultrasound data, and an acoustic window disposed over the transducer array. The acoustic window comprises an end surface configured to contact a subject. The end surface comprises a compound shape (Continued)

including one or more curved sections and one or more straight sections. Associated methods, devices, and systems are also provided.

17 Claims, 7 Drawing Sheets

(52) U.S. Cl.
CPC .......... *A61B 8/4488* (2013.01); *A61B 8/4281* (2013.01); *A61B 8/4405* (2013.01)

(56) References Cited

U.S. PATENT DOCUMENTS

| | | | | |
|---|---|---|---|---|
| 4,532,933 | A | 8/1985 | Hokanson | |
| 5,083,568 | A * | 1/1992 | Shimazaki | G10K 11/345 |
| | | | | 600/459 |
| 5,577,507 | A * | 11/1996 | Snyder | A61B 8/4281 |
| | | | | 600/472 |
| 5,820,564 | A * | 10/1998 | Slayton | G10K 11/30 |
| | | | | 600/459 |
| 5,922,962 | A * | 7/1999 | Ishrak | G10K 11/34 |
| | | | | 73/632 |
| 9,114,247 | B2 * | 8/2015 | Barthe | A61N 7/022 |
| D767,150 | S | 9/2016 | Moon et al. | |
| 9,510,802 | B2 * | 12/2016 | Barthe | A61B 8/467 |
| 2003/0011285 | A1 | 1/2003 | Ossmann | |
| 2008/0156577 | A1 * | 7/2008 | Dietz | G10K 11/30 |
| | | | | 181/176 |
| 2008/0255456 | A1 | 10/2008 | Kye et al. | |
| 2014/0290371 | A1 * | 10/2014 | Nakamura | G10K 11/02 |
| | | | | 73/644 |
| 2016/0031128 | A1 | 2/2016 | Kiyose | |
| 2016/0199029 | A1 | 7/2016 | Struijk et al. | |
| 2017/0000459 | A1 * | 1/2017 | Shikata | A61B 8/4281 |
| 2017/0043189 | A1 * | 2/2017 | Stoddard | G10K 11/24 |
| 2019/0030917 | A1 | 1/2019 | Ohnishi | |
| 2019/0069842 | A1 | 3/2019 | Rothberg et al. | |
| 2019/0307422 | A1 * | 10/2019 | Makita | B06B 1/0622 |
| 2020/0337677 | A1 * | 10/2020 | Saito | G01N 29/221 |

FOREIGN PATENT DOCUMENTS

| | | | |
|---|---|---|---|
| DE | 3722943 A1 * | 2/1988 | ............... A61B 8/14 |
| EP | 1935343 A1 | 6/2008 | |
| JP | S58127300 U | 8/1983 | |
| WO | 2018178369 A1 | 10/2018 | |

OTHER PUBLICATIONS

Machine-generated English translation of CN-104068891-A (Year: 2024).*

Machine-generated English translation of CN-102740777-B (Year: 2024).*

International Search Report and Written Opinion for PCT/EP2020/066223; Mailing Date: Sep. 21, 2020; 9 pages.

* cited by examiner

ACOUSTIC WINDOW WITH COMPOUND SHAPE FOR ULTRASOUND PROBE

CROSS-REFERENCE TO PRIOR APPLICATIONS

This application is the U.S. National Phase application under 35 U.S.C. § 371 of International Application No. PCT/EP2020/066223, filed on Jun. 11, 2020, which claims the benefit of U.S. Provisional Patent Application No. 62/860,291, filed on Jun. 12, 2019. These applications are hereby incorporated by reference herein.

TECHNICAL FIELD

The present disclosure relates generally to an ultrasound probe, and in particular, to an acoustic window with a compound geometry that advantageously maximizes the size of the acoustic window and minimizes the footprint of the ultrasound probe.

BACKGROUND

Ultrasound probes have become indispensable diagnostic tools in modern day medical care due to their non-invasive nature and ever-increasing resolution. During an ultrasound scan, sonographers need clear acoustic paths inside a patient to produce clear, unobstructed images. One major obstacle in ultrasound imaging is patient's bones obstructing the image. This is particularly true for ribs during cardiac scanning. To obtain the clear, unobstructed image of the heart, the sonographer must position the transducer between the rib spaces. Generating such a clear, unobstructed image can be challenging on petite patients with smaller gaps between their ribs. Searching for the image can also be uncomfortable for the patient as the sonographer may apply additional pressure on the thin tissue between the probes and ribs. The handle of the ultrasound probe is typically made of a hard plastic. Conventional ultrasound probes have a hard, plastic nose that drives into a patient's ribs, which causes discomfort for patients, particular those who are older and/or thinner. The patient's discomfort can often lead to longer scan times as the sonographer tries to obtain the necessary images without hurting the patient.

SUMMARY

The present disclosure provides an improved ultrasound probe with an acoustic window having a compound shape. In particular, the continuous surface of the acoustic window that contacts the patient during imaging has a curved section with two straight portions on either side of the curved portion. The two straight portions serve as stabilizers that are positioned against, e.g., a patient's ribs, so that the center, curved section is positioned in the space between the ribs. This advantageously allows the ultrasound probe to more easily obtain higher quality images of, e.g., a patient's heart. The transition between the curved and straight sections form gutters that trap ultrasound gel between the acoustic window and the patient's skin during an imaging procedure. The presence of more ultrasound gel improves images quality and speeds up the imaging procedure because the user is less likely to have to reapply ultrasound gel. The curved section also has a smaller radius of curvature compared to conventional devices, which advantageously reduces acoustic reverberations and improves ultrasound image quality. The acoustic window forms the entire end of the ultrasound probe that contacts the patient. This is more comfortable for the patient because the acoustic window is formed of a softer material, compared to the harder material that is used for the housing of ultrasound probe. This also reduces the footprint or the amount of the hard plastic at the end of the ultrasound probe that contacts the patient. Minimizing the footprint makes it faster and easier for a user to position the ultrasound probe on the patient's skin to image the desired anatomy within the patient's body.

According to an exemplary embodiment, an ultrasound probe is provided. The ultrasound probe includes a housing configured to be grasped by a user; a transducer array coupled to the housing and configured to obtain ultrasound data; and an acoustic window disposed over the transducer array, wherein the acoustic window comprises an end surface configured to contact a subject, wherein the end surface comprises a compound shape including one or more curved sections and one or more straight sections.

In some embodiments, the compound shape comprises a curved section, and a first straight section and a second straight section disposed on opposite sides of the curved section. In some embodiments, the curved section is convex. In some embodiments, the first straight section and the second straight section are obliquely angled. In some embodiments, the end surface comprises a first dimension, and a perpendicular, second dimension; the second dimension is larger than the first dimension; and the curved section, the first straight section, and the second straight section extend longitudinally along the second dimension. In some embodiments, the acoustic window comprises one or more gutters configured to hold ultrasound gel, wherein the one or more gutters comprise a transition in the compound shape of the end surface between the one or more curved sections and the one or more straight sections. In some embodiments, the one or more gutters comprise: a first gutter comprising the transition between the curved section and the first straight section; and a second gutter comprising the transition between the curved section and the second straight section. In some embodiments, the transition is concave. In some embodiments, the acoustic window is structurally arranged such that the first straight section is configured to be positioned against to a first rib, the second straight section is configured to be positioned against an adjacent, second rib, and the curved section is configured to be positioned against tissue between first rib and the second rib. In some embodiments, the acoustic window comprises a perimeter surrounding the end surface. In some embodiments, the perimeter comprises a radiused edge adjacent to the end surface. In some embodiments, the perimeter comprises a lateral surface adjacent to the radiused edge. In some embodiments, the lateral surface is obliquely angled relative to the end surface. In some embodiments, the ultrasound probe further comprises: a distal surface, wherein the end surface of the acoustic window forms an entirety of the distal surface; and a side surface, wherein the lateral surface of the perimeter of the acoustic window forms a first portion of the side surface and the housing forms a second portion of the side surface. In some embodiments, the acoustic window comprises a rectangular profile. In some embodiments, the transducer array comprises a two-dimensional array. In some embodiments, the housing comprises a distal portion and a proximal portion, wherein the distal portion comprises a bulbous shape defining a ledge against which a hand of the user is positioned when grasping the proximal portion. In some embodiments, the housing comprises a first material, and the acoustic window comprises a softer, second material.

According to an exemplary embodiment, a system is provided. The system includes an ultrasound probe, comprising: a housing configured to be grasped by a user; a transducer array coupled to the housing and configured to obtain ultrasound data; and an acoustic window disposed over the transducer array, wherein the acoustic window comprises an end surface configured to contact a subject, wherein the end surface comprises a compound shape including one or more curved sections and one or more straight sections; and a computer in communication with the ultrasound probe and configured to generate an ultrasound image based on the ultrasound data.

Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which.

DETAILED DESCRIPTION

Figure 1:
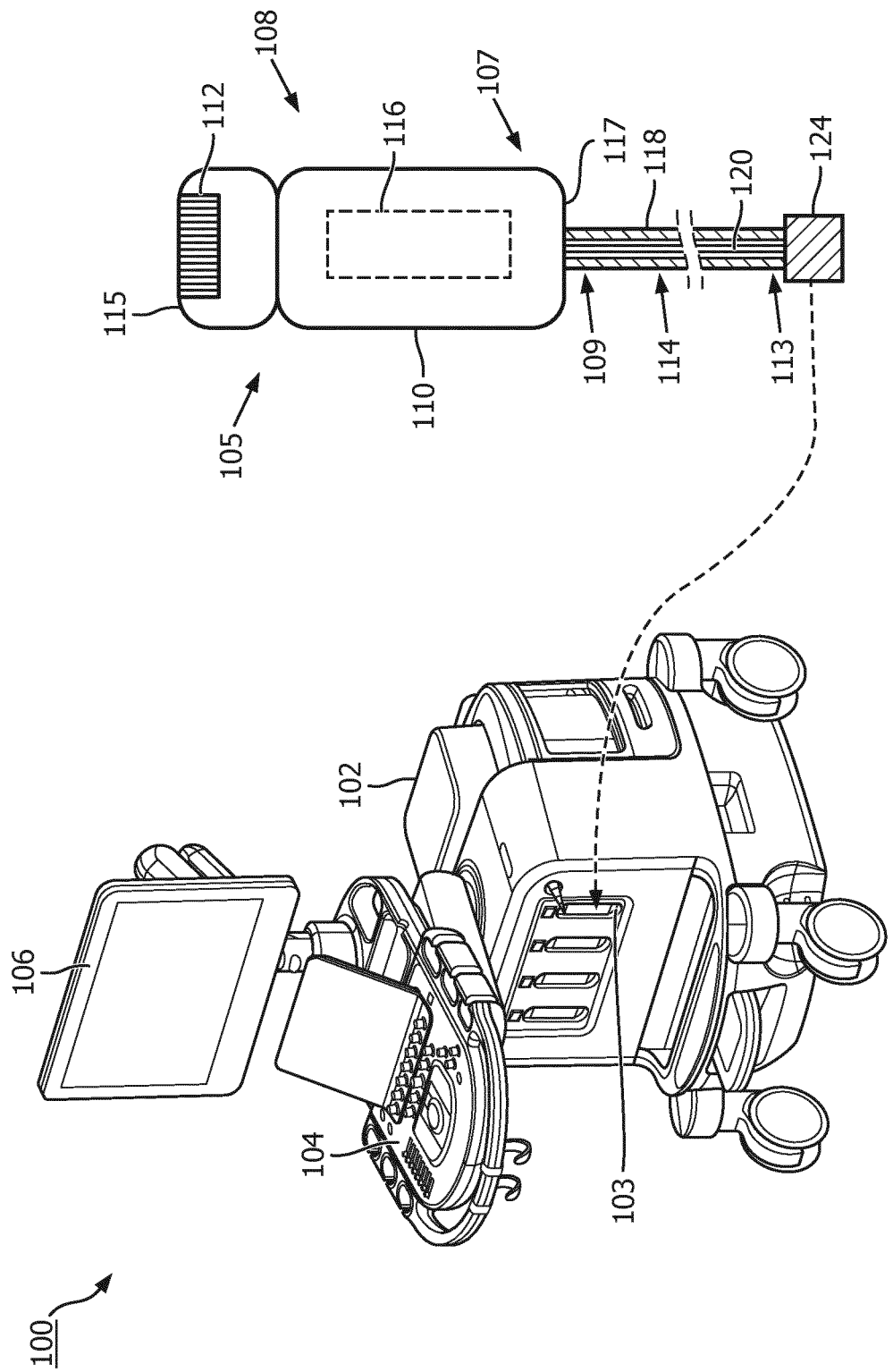
FIG. 1 is a diagrammatic schematic view of an ultrasound imaging system, including a console and an ultrasound probe, according to aspects of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a diagrammatic perspective view of an ultrasound imaging system 100, according to aspects of the present disclosure. The ultrasound imaging system 100 includes a console 102 and an ultrasound probe 108. The ultrasound imaging system 100 may be used to obtain and display ultrasound images of anatomy. In some circumstances, the system 100 may include additional elements and/or may be implemented without one or more of the elements illustrated in FIG. 1.

The ultrasound probe 108 is sized and shaped, structurally arranged, and/or otherwise configured to be placed on or near the anatomy of a subject to visualize anatomy inside of the subject's body. The subject may be a human patient or animal. The ultrasound probe 108 may be positioned outside the body of the subject. In some embodiments, the ultrasound probe 108 is positioned proximate to and/or in contact with the body of the subject. For example, the ultrasound probe 108 may be placed directly on the body of the subject and/or adjacent to the body of the subject. The view of the anatomy shown in the ultrasound image depends on the position and orientation of the ultrasound probe 108. To obtain ultrasound data of the anatomy, the ultrasound probe 108 can be suitably positioned and oriented by a user, such as a physician, sonographer, and/or other medical personnel, so that a transducer array 112 emits ultrasound waves and receives ultrasound echoes from the desired portion of the anatomy. The ultrasound probe 108 may be portable and suitable for use in a medical setting. In some instances, the ultrasound probe 108 can be referenced as an ultrasound imaging device, a diagnostic imaging device, external imaging device, transthoracic echocardiography (TTE) probe, and/or combinations thereof.

The ultrasound probe 108 includes a housing 110 structurally arranged, sized and shaped, and/or otherwise configured for handheld grasping by a user. The housing 110 can be referenced as a handle in some instances. A proximal portion 107 of the housing 110 can be referenced as a handle in some instances. The housing 110 surrounds and protects the various components of the imaging device 108, such as electronic circuitry 116 and the transducer array 112. Internal structures, such as a space frame for securing the various components, may be positioned within the housing 110. In some embodiments, the housing 110 includes two or more portions which are joined together during manufacturing. The housing 110 can be formed from any suitable material, including a plastic, a polymer, a composite or combinations thereof. For example, the housing 110 can be formed of acrylonitrile butadiene styrene (ABS), polysulfone (PSU), and/or polybutylene terephthalate (PBT). In some embodiments, the material of the housing 110 can include glass fibers.

The housing 110 and/or the ultrasound probe 108 includes a proximal portion 107 terminating a proximal end 117 and a distal portion 105 terminating at a distal end 115. In some instances, the ultrasound probe 108 can be described as having the proximal portion 107 and the distal portion 105. An imaging assembly of the ultrasound probe 108, including the transducer array 112, is disposed at the distal portion 105. All or a portion of the imaging assembly of the ultrasound probe 108 can define the distal end 115. The transducer array 112 can be directly or indirectly coupled to the housing 110. The operator of the ultrasound probe 108 may contact the distal end 115 of the ultrasound probe 108 to the body of the patient such that the anatomy is compressed in a resilient manner. For example, the imaging assembly, including the transducer array 112, may be placed directly on or adjacent to the body of the subject. In some instances, the distal portion 105 is placed directly in contact with the body of the subject such that the transducer array 112 is adjacent to the body of the subject.

The ultrasound probe 108 is configured to obtain ultrasound imaging data associated with any suitable anatomy of the patient. For example, the ultrasound probe 108 may be used to examine any number of anatomical locations and tissue types, including without limitation, organs including the liver, heart, kidneys, gall bladder, pancreas, lungs; ducts; intestines; nervous system structures including the brain, dural sac, spinal cord and peripheral nerves; the urinary tract; as well as valves within the blood vessels, blood, chambers or other parts of the heart, and/or other systems of the body. The anatomy may be a blood vessel, such as an artery or a vein of a patient's vascular system, including cardiac vasculature, peripheral vasculature, neural vasculature, renal vasculature, and/or any other suitable lumen inside the body. In addition to natural structures, the ultrasound probe 108 may be used to examine man-made structures such as, but without limitation, heart valves, stents, shunts, filters and other devices.

The transducer array 112 is configured to emit ultrasound signals, and receive ultrasound echo signals corresponding to the emitted ultrasound signals. The echo signals are reflections of the ultrasound signals from anatomy with the subject's body. The ultrasound echo signals may be processed by the electronic circuitry 116 in the ultrasound probe 108 and/or in the console 102 to generate ultrasound images. The transducer array 112 is part of the imaging assembly of the ultrasound probe 108, including an acoustic window/lens and a matching material on a transmitting side of the transducer array 112, and an acoustic backing material on a backside of the transducer array 112. The acoustic window and the matching material have acoustic properties that facilitate propagation of ultrasound energy in desired directions (e.g., outwards, into the body of the patient) from the transmitting side of the transducer array 112. The backing material has acoustic properties that impede or limit propagation of ultrasound energy in undesired directions (e.g., inwards, away from the body of the patient) from the backside of the transducer array 112.

The transducer array 112 may include any number of transducer elements. For example, the array can include between 1 acoustic element and 10000 acoustic elements, including values such as 2 acoustic elements, 4 acoustic elements, 15 acoustic elements, 64 acoustic elements, 128 acoustic elements, 500 acoustic elements, 812 acoustic elements, 3000 acoustic elements, 9000 acoustic elements, and/or other values both larger and smaller. The transducer elements of the transducer array 112 may be arranged in any suitable configuration, such as a linear array, a planar array, a curved array, a curvilinear array, a circumferential array, an annular array, a phased array, a matrix array, a one-dimensional (1D) array, a 1.x dimensional array (e.g., a 1.5D array), or a two-dimensional (2D) array. The array of transducer elements (e.g., one or more rows, one or more columns, and/or one or more orientations) can be uniformly or independently controlled and activated. The transducer array 112 can be configured to obtain one-dimensional, two-dimensional, and/or three-dimensional images of patient anatomy. The ultrasound transducer elements may be piezoelectric/piezoresistive elements, piezoelectric micromachined ultrasound transducer (PMUT) elements, capacitive micromachined ultrasound transducer (CMUT) elements, and/or any other suitable type of ultrasound transducer elements.

The transducer array 112 is in communication with (e.g., electrically coupled to) the electronic circuitry 116. The electronic circuitry 116 can be any suitable passive or active electronic components, including integrated circuits (ICs), for controlling the transducer array 112 to obtain ultrasound imaging data and/or processing the obtained ultrasound imaging data. For example, the electronic circuitry 116 can include one or more transducer control logic dies. The electronic circuitry 116 can include one or more application specific integrated circuits (ASICs). In some embodiments, one or more of the ICs can comprise a microbeamformer (OF), an acquisition controller, a transceiver, a power circuit, a multiplexer circuit (MUX), etc. In some embodiments, the electronic circuitry 116 can include a processor, a memory, a gyroscope, and/or an accelerometer. The electronic circuitry 116 is disposed within the ultrasound probe 108 and surrounded by the housing 110.

The ultrasound probe 108 includes a cable 114 to provide signal communication between the console 102 and one or more components of the ultrasound probe 108 (e.g., the transducer array 112 and/or the electronic circuitry 116). The cable 114 includes multiple electrical conductors 120 configured to carry electrical signals between the console 102 and the ultrasound probe 108. For example, electrical signals representative of the imaging data obtained by the transducer array 112 can be transmitted from the ultrasound probe 108 to the console 102 via the electrical conductors 120. Control signals and/or power can be transmitted from the console 102 to the ultrasound probe 108 via the electrical conductors 120. The cable 114 and/or electrical conductors 120 may provide any type of wired connection, such as a proprietary connection, an Ethernet connection, a Universal Serial Bus (USB) connection of any version or a mini USB of any version. The cable 114 can also include a conduit 118 surrounding the electrical conductors 120. The conduit 118 protects the electrical conductors 120 by preventing their direct exposure to outside elements. A distal portion 109 of the cable 114 is coupled to the proximal portion 107 of the housing 110 of the ultrasound probe 108.

A connector 124 is located at a proximal portion 113 of the cable 114. The connector 124 is configured for removably coupling with the console 102. Signal communication between the ultrasound probe 108 and the console 102 is established when the connector 124 is received within a receptacle 103 of the console 102. In that regard, the ultrasound probe 108 can be electrically and/or mechanically coupled to the console 102. The console 102 can be referenced as a computer or a computing device in some instances. The console 102 includes a user interface 104 and a display 106. The console 102 is configured to process the ultrasound imaging data obtained by the ultrasound probe 108 to generate an ultrasound image and output the ultrasound image on the display 106. A user can control various aspects of acquiring ultrasound imaging data by the ultrasound probe 108 and/or display of ultrasound images by providing inputs at the user interface 104. The imaging device 108 and display 106 may be communicatively coupled directly or indirectly to the console 102.

One or more image processing steps can be completed by the console 102 and/or the ultrasound probe 108. The console 102 and/or the ultrasound probe 108 can include one or more processors in communication with memory. The processor may be an application-specific integrated circuit (ASIC), a field-programmable gate array (FPGA), a central processing unit (CPU), a digital signal processor (DSP), another hardware device, a firmware device, or any combination thereof configured to perform the operations described herein. In some embodiments, the memory is a random access memory (RAM). In other embodiments, the memory is a cache memory (e.g., a cache memory of the processor), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some embodiments, the memory may include a non-transitory computer-readable medium. The memory may store instructions. The instructions may include instructions that, when executed by a processor, cause the processor to perform operations described herein.

While the console 102 is a movable cart in the illustrated embodiment of FIG. 1, it is understood that the console 102 can be a mobile device (e.g., a smart phone, a tablet, a laptop, or a personal digital assistant or PDA) with integrated processor(s), memory, and display. For example, a touchscreen of the mobile device can be the user interface 104 and the display 106.

Figure 2:
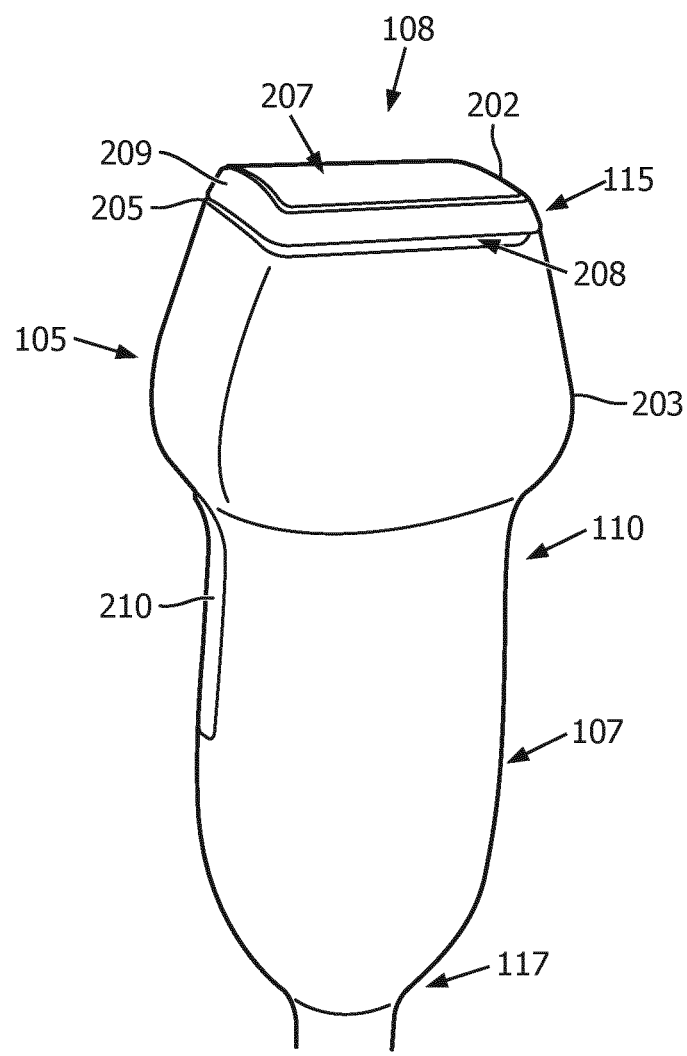
FIG. 2 is a diagrammatic perspective view of an ultrasound probe, according to aspects of the present disclosure.

FIG. 2 is a diagrammatic, perspective view of the ultrasound imaging probe 108, according to aspects of the present disclosure. During operation of the ultrasound probe 108, the user positions one hand around the proximal portion 107 of the housing 110. The proximal portion 107 of the housing 110 can include a projection 210 formed on a side surface thereof. In the illustrated embodiment of FIG. 2, the projection 210 on one side of the probe 108 is shown. It is understood that another projection 210 can be provided on the opposite side of the probe 108. The projection 210 is a projection that extends outward from adjacent portions of the housing 110. In that regard, the distal portion 105 and/or the proximal portion 107 can have a generally smooth exterior surface. The projection 210 is a structural variation in the smooth exterior surface that allows a user to have better grip on the housing 110. In general, the housing 110 can include any suitable structural variations that improve a user's grip, including ridges, grooves, projections, texturing, and shaping.

The distal portion 105 of the housing 110 can have a bulbous shape 203 at the interface with the narrower proximal portion 107. The bulbous portion 203 (e.g., the base of the bulbous portion, at the interface with the narrower proximal portion 107) defines a ledge against which the user's hand is positioned when the user grasps the proximal portion 107. In some instances, the ledge provides leverage for the user to push while placing the ultrasound probe 108 in the desired position and/or orientation for imaging. The projection 210 and/or the bulbous shape 203 can advantageously improve the ergonomics of the ultrasound probe 108 and make the ultrasound probe 108 more comfortable for the user to securely hold. The distal portion 105 tapers from the bulbous portion 203 to a distal end 205 of the housing 110. In some instances, the distal portion 105 of the housing 110 can be referenced as a nosepiece or nose of the ultrasound probe 108.

The distal end 115 of the ultrasound probe 108 includes an acoustic window 202, which is positioned over the transducer array 112 (FIG. 1). The acoustic window 202 can be referenced as a lens in some instances. The acoustic window 202 forms a part of the imaging assembly of the ultrasound probe 108. In that regard, the acoustic window 202 can be mechanically and/or acoustic coupled to the transducer array 112. For example, the acoustic window 202 can be directly or indirectly (e.g., via an adhesive) in contact with the transmitting side of the transducer array 112. As described herein, the acoustic window 202 has a compound shape that advantageously improves usability of the ultrasound probe 108, image quality, and patient comfort. The acoustic window 202 is positioned adjacent to and/or proximate to the distal portion 105 of the housing 110.

The acoustic window 202 includes a distalmost end surface 207 that contacts the patient when the acoustic window 202 is contacted against the skin of the subject during imaging. The end surface 207 can form the entirety of the distal surface (e.g., the outermost and distalmost surface) of the ultrasound probe 108. The acoustic window 202 can include a perimeter 209 surrounding the end surface 207. The perimeter 209 forms a distal portion of the side surfaces of the ultrasound probe 108. In that regard, at the distal end 115 of the ultrasound probe 108, the acoustic window 202 (and not the housing 110) defines both the end surface and the side surface. The more proximal portions of the side surfaces of the ultrasound probe are formed by the exterior surfaces of the housing 110.

The ultrasound probe 108 advantageously includes a smaller nose footprint. In that regard, conventionally, probes have larger footprints because the handle forms at least a portion of the distalmost end of the probe. That is, conventional devices required a larger footprint because some space was needed for the handle at the distalmost end. By eliminating the distal portion 105 of the housing 110 from the distalmost end 207 of the ultrasound probe 108, and instead having only the acoustic window 202 at the distalmost end 207 of the ultrasound probe 108, the size of the nose footprint is advantageously reduced. Because of the smaller footprint of the ultrasound probe 108, the acoustic window 202 can be more easily positioned by the sonographer between the patient's ribs, which advantageously provides higher quality images in the intercostal spaces. Better positioning in the rib spaces also advantageously decreases the likelihood of imaging artifacts in the ultrasound images, such as those caused by the patient's ribs. The smaller nose footprint also advantageously improves the efficiency in achieving the diagnostic images with the ultrasound probe 108, because it is easier for a user to position the acoustic window 202 with desired position and/or orientation.

The acoustic window 202 can be formed of a softer and/or more elastic material than the material forming the housing 110. In that regard, the acoustic window 202 can be formed of any suitable, acoustically favorable material, such as a plastic, a polymer, a composite or combinations thereof. Because the softer acoustic window 202 defines the end surface and side surfaces at the distal end 115 of the ultrasound probe 108, the imaging procedure is advantageously more comfortable for the patient even when the user angles or presses the probe onto the patient to obtain a clearer view of the anatomy. In contrast, conventionally, the hard plastic of the handle formed on some or on all of the surfaces (e.g., end and/or side) of the probe, has caused discomfort for the patient.

In some embodiments, the acoustic window 202 is spaced from the distal end 205 of the housing 110. A filling material 208 can be disposed in the space between the acoustic window 202 and the distal end 205 such there is no fluid ingress into the interior of the housing 110 and/or accumulation of biological material. The filling material 208 can be an adhesive, a silicone, an epoxy, a resin, a rubber, other suitable materials, and/or combinations thereof. For example, the filling material 208 can be room temperature vulcanizing (RTV) silicone rubber, adhesive, and/or pre-polymers and polymers which contain epoxide groups.

Figure 3:
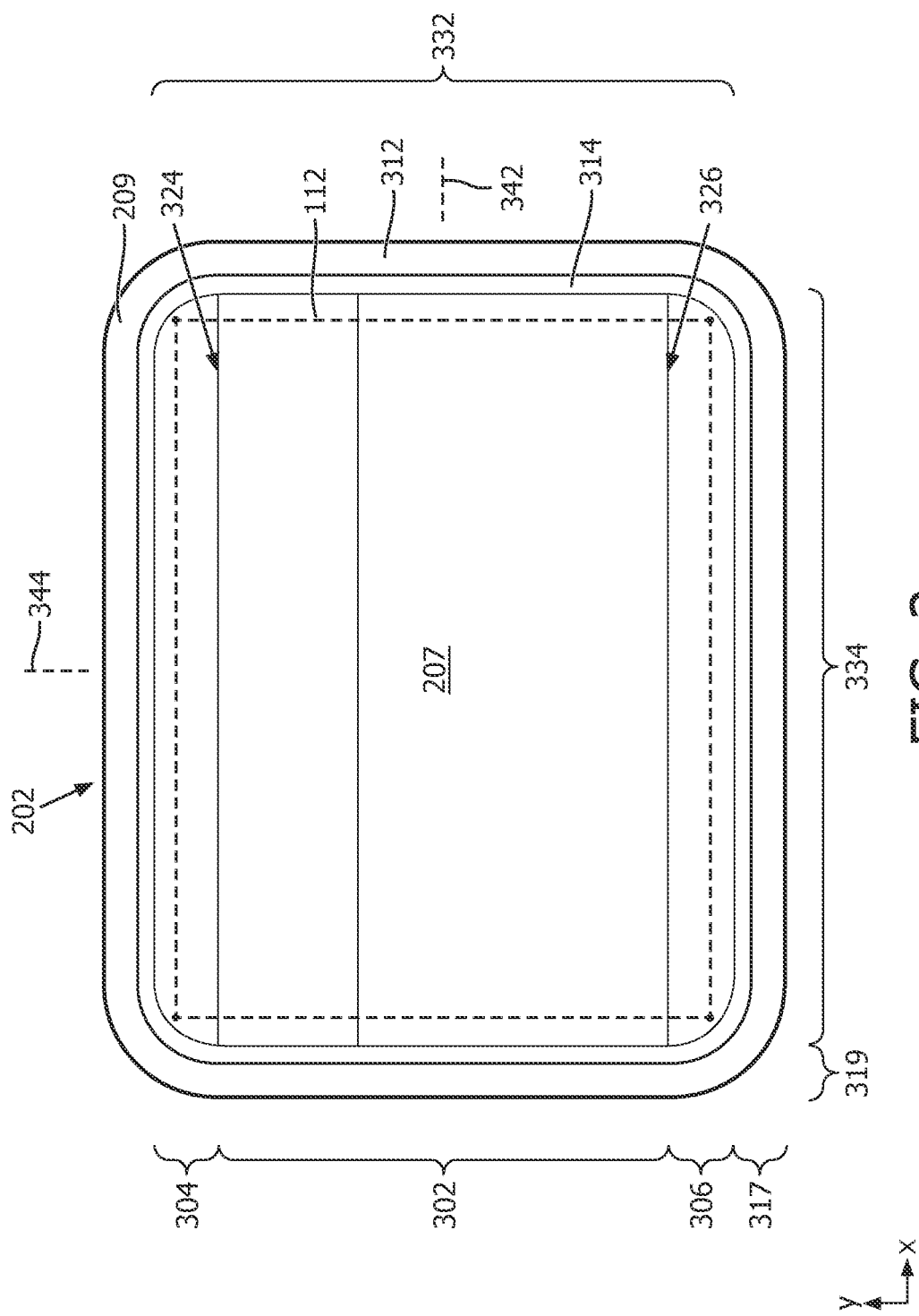
FIG. 3 is a diagrammatic top view of an acoustic window of an ultrasound probe, according to aspects of the present disclosure.
Figure 4:
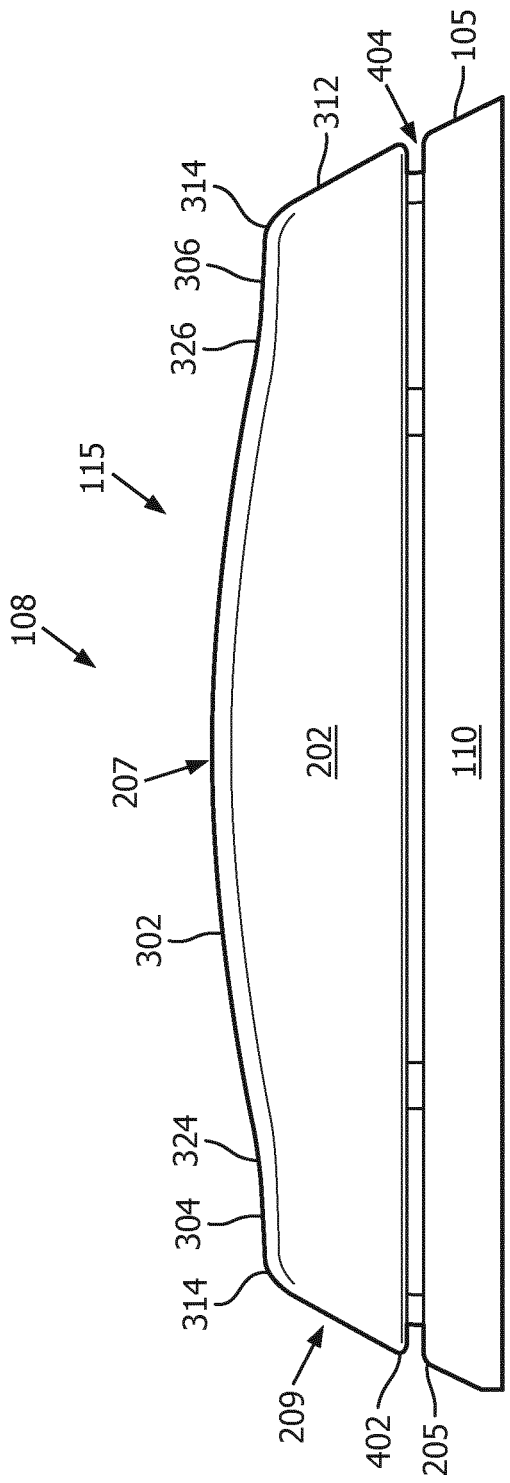
FIG. 4 is a diagrammatic side view of a distal end of an ultrasound probe, including an acoustic window and a distal portion of a housing, according to aspects of the present disclosure.
Figure 5:
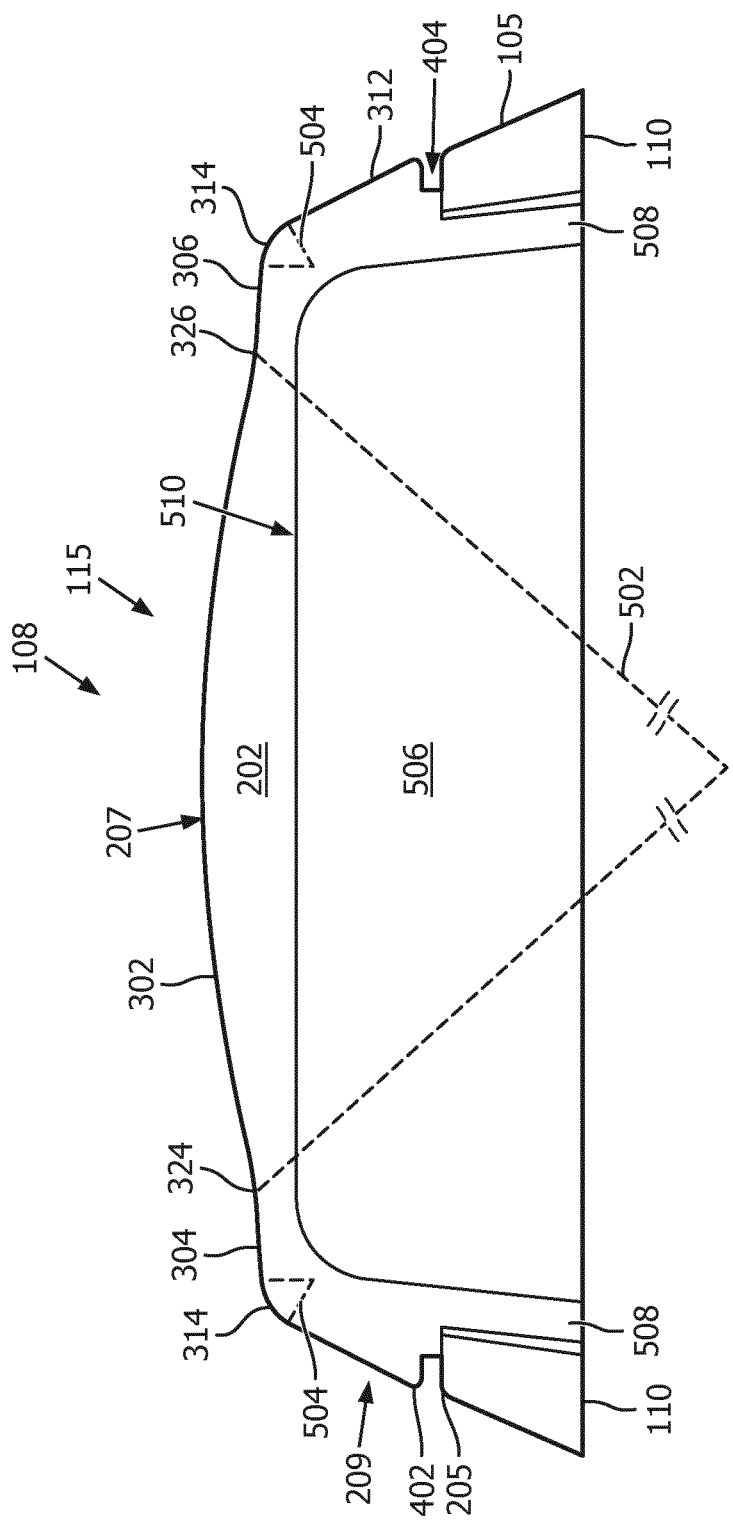
FIG. 5 is a diagrammatic, cross-sectional side view of the ultrasound probe of FIG. 4.
Figure 6:
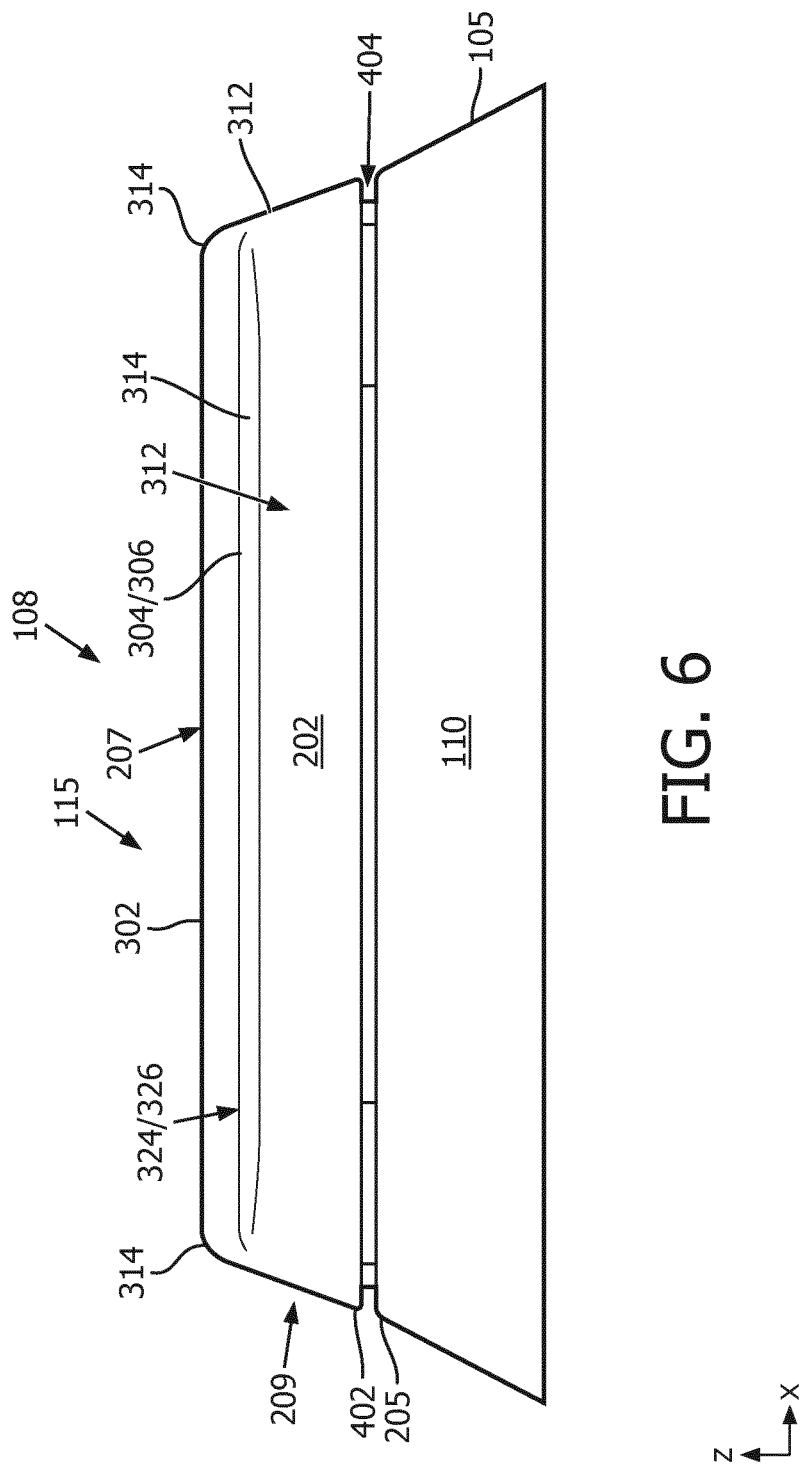
FIG. 6 is a diagrammatic side view, rotated 90° relative to FIG. 4, of a distal end of an ultrasound probe, including an acoustic window and a distal portion of a housing, according to aspects of the present disclosure.
Figure 7:
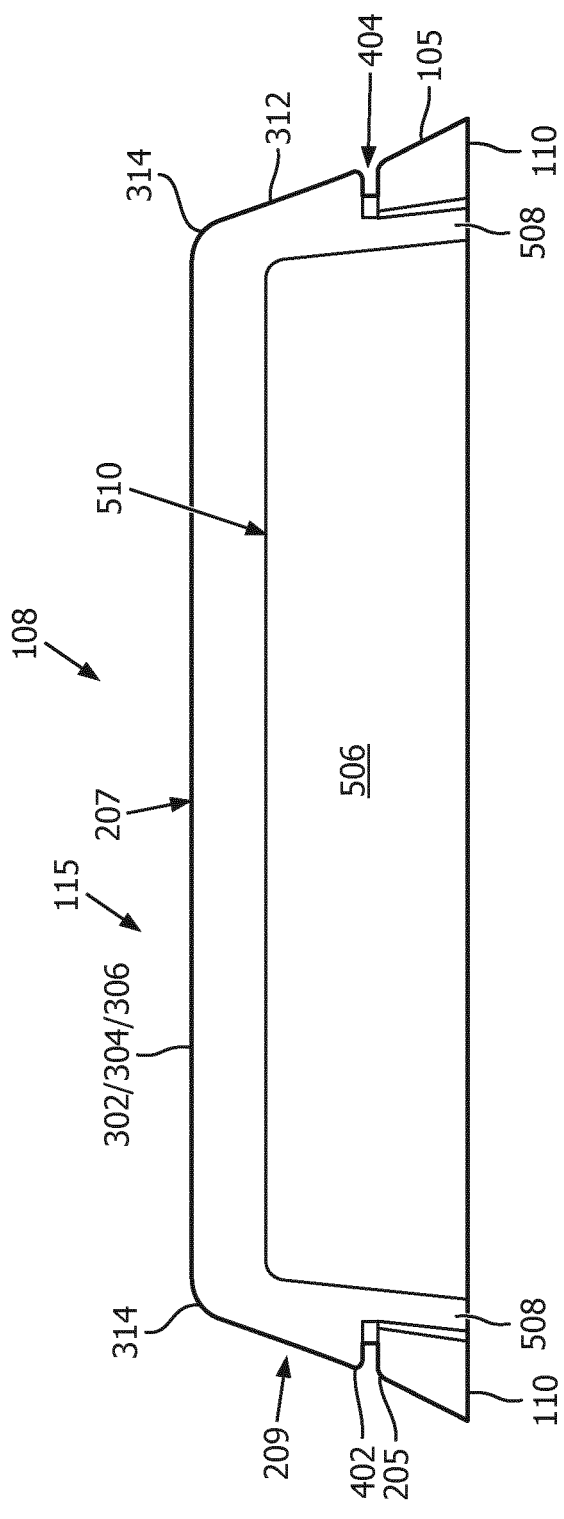
FIG. 7 is a diagrammatic, cross-sectional side view of the ultrasound probe of FIG. 6, according to aspects of the present disclosure.

FIGS. 3-7 illustrate one or more components at the distal end 115 of the ultrasound probe 108, including the acoustic window 202 and/or the distal portion 105 of the housing 110, according to aspects of the present disclosure. FIG. 3 is a diagrammatic top view of acoustic window 202. FIG. 4 is a diagrammatic side view of the distal end 115 of the ultrasound probe 108. FIG. 5 is a diagrammatic, cross-sectional side view of the distal end 115 of the ultrasound probe 108 shown in FIG. 4. FIG. 6 is a diagrammatic side view of the distal end 115 of the ultrasound probe 108, rotated 90° relative to view shown FIG. 4. FIG. 7 is a diagrammatic, cross-sectional side view of the distal end 115 of the ultrasound probe 108 shown in FIG. 6.

The distalmost end surface 207 of the acoustic window 202 that contacts the patient includes a curved section 302, a straight section 304, and a straight section 306. The curved section 302 and the straight sections 304, 306 are exterior, distal surfaces of the acoustic window 202. The straight sections 304, 306 are disposed on opposite sides of the curved section 302. The straight sections 304, 306 can be generally planar. As shown in FIGS. 4 and 5, the straight sections 304, 306 extend at an oblique angle relative to, e.g., the distal end 205 of the housing 110, which can extend at 0° horizontally. The curved section 302 can have a convex shape. The straight sections 304, 306 extend continuously from the curved section 302 to form the compound shape for the end surface 207.

The compound shape of the end surface 207 is particularly advantageous for cardiac imaging. In that regard, the acoustic window 202 can be positioned in the intercostal space such that the straight section 304 is positioned against one rib, the straight section 306 is positioned against an adjacent rib, and the curved section 302 is positioned against the tissue between the two adjacent ribs. The straight sections 304, 306 advantageously serve as stabilizers for the acoustic window 202 and/or the ultrasound probe 108. Conventional devices include only single shape that contacts the patient's skin (e.g., a planar shape or a curve shape with a single radius of curvature), which are particularly sensitive to any movements by the sonographer. Because the straight sections 304, 306 bear against the patient's ribs, the ultrasound probe 108 experiences less rocking during the ultrasound examination. The straight sections 304, 306 help the sonographer retain the position of the ultrasound probe 108 after acquiring an imaging window. This advantageously improves the efficiency of the imaging workflow by avoiding repetition of imaging during patient examination.

The acoustic window 202 and/or the distalmost end surface 207 can be described with reference to at least two dimensions, in some instances. Two dimensions are identified as an x-dimension and a y-dimension in FIGS. 3-7. The two dimensions are perpendicular to one another. In an exemplary embodiment, the curved section 302 has positive curvature along the y-dimension only, and not the x-dimension (FIGS. 6 and 7). The positive curvature can provide the convex shape for the curved section 302. The curved section 302 and the straight sections 304, 306 have zero curvature along the x-dimension (FIGS. 6 and 7). The straight sections 304, 306 also have zero curvature along the y-dimension (FIGS. 4 and 5). The acoustic window 202 can also be described with reference to a third dimension. For example, the acoustic window 202 includes a height in the z-dimension. The acoustic window 202 can be symmetrical about a central axis 342 along the x-dimension and a central axis 344 along the y-dimension (FIG. 3).

The acoustic window 202 and/or the distalmost end surface 207 can have a generally rectangular profile, as shown in the top-down view of FIG. 3. The generally rectangular profile of the acoustic window 202 and/or the surface 207 can have rounded corners. The acoustic window 202 and/or the surface 207 can be longer in the x-dimension and shorter in the y-dimension. In that regard, the curved section 302 and the straight sections 304, 306 can extend longitudinally along the longer x-dimension. A length 334 of the acoustic window 202 can be between approximately 15 mm and approximately 30 mm and/or between approximately 20 mm and 25 mm, including values such as 22.4 mm, 24 mm, 24.5 mm, and/or other suitable values both larger and smaller. A width 332 of the acoustic window 202 can be between approximately 10 mm and approximately 20 mm and/or between approximately 15 mm and 18 mm, including values such as 16 mm, 17.4 mm, 19 mm, and/or other suitable values both larger and smaller. The perimeter 209 can include dimensions such as a width 317 and a length 319. The width 317 and/or the length 319 can be between approximately 1 mm and approximately 3 mm in some embodiments.

As shown in FIG. 5, the curved section 302 has a radius of curvature 502. In some embodiments, the radius of curvature 502 can be between approximately 20 mm and approximately 30 mm, including values such as 23 mm, 25 mm, 27 mm, and/other suitable values both larger and smaller. The radius of curvature 502 of the curved section 302 is advantageously smaller or tighter than those in conventional devices. In that regard, the curved section 302 is more curved or more convex than those in conventional devices, which have a flatter profile on the nose. The tighter radius of curvature 502 decreases reverberation during ultrasound transmission and reception, which advantageously improves ultrasound image quality. In some embodiments, the curved section 302 can have a larger (flatter) or a smaller (curvier) radius of curvature 502. In some embodiments, the curved section 502 can have a spherical radius. For example, the curved section 502 can have positive curvature (e.g., convex) in both the x-dimension and the y-dimension.

The acoustic window 202 can be particularly advantageous in embodiments in which the transducer array 112 is a two-dimensional, matrix array in which each transducer element or groups of transducer elements can be individually controlled. In some instances, matrix arrays have larger apertures than linear arrays. According to aspects of the present disclosure, the acoustic window 202 minimizes the nose footprint of the probe 108 to be smaller or equal in size to the nose footprints of linear array probes. While one embodiment of the acoustic window 202 is described with respect to matrix array, it is understood that the ultrasound probe 108 can include any suitable type of ultrasound array 112. For example, the same design for the acoustic window 202 could be used on a linear array probe. The curved nose design helps acoustically by advantageously increasing the speed at which the user can obtain a diagnostic image. An exemplary profile of the transducer array 112 is illustrated in FIG. 3. The profile of the transducer array 112 can be rectangular in some embodiments. The area of the transducer array 112 overlaps with the curved section 302 and the straight sections 304, 306 of the acoustic window 202.

The acoustic window 202 includes a thickness between the distalmost end surface 207 and an interior surface 510, as shown in FIGS. 5 and 7. The interior surface 510 is adjacent to a space 506 within the housing 110 in which the transducer array 112 and/or electronic circuitry 116 are positioned. In some embodiments, the inner surface 510 is generally planar with rounded corners. For example, the inner surface 510 can have zero curvature in the x-dimension and y-dimension in the area that overlaps with the curved section 302 and portions of the straight sections 304, 306. The transmitting side of the inner surface 510 can be contacted directly or indirectly (e.g., using an adhesive) with the inner surface 510. Because of the curvature of the distalmost end surface 207, the thickness of the acoustic window 202 varies along the y-dimension (FIG. 5). In that regard, the curved section 302 is thicker than the straight sections 304, 306. For any given axis along the x-dimension, the thickness of the acoustic window 202 does not vary because the distalmost end surface 207 has zero curvature along x-dimension (FIG. 7). As shown in FIGS. 5 and 7, a proximal portion 508 of the acoustic window is received within the distal portion 105 of the housing 110.

The acoustic window 202 includes gutters 324, 326, which are positioned on opposite sides of the curved section 302. The gutters 324, 326 are sized and shaped, structurally arranged and/or are configured to hold ultrasound gel during an imaging procedure. The gutters 324, 326 are the transitions in the shape of the distalmost end surface 207 between the curved section 302 and the straight sections 304, 306. In that regard, the gutter 324 is formed by the transition between the curved section 302 and the straight section 304, and the gutter 326 is formed by the transition between the curved section 302 and the straight section 306. Each of the gutters 324, 326 can be described as having a generally, concave radius a result of the changes in shape of the end surface 207. Capturing the ultrasound gel between the gutters 324, 326 advantageously increase the amount of gel that is positioned between the acoustic window 202 and the patient's skin during imaging. Conventional devices have a single radius of curvature, which does not assist in trapping ultrasound gel. Indeed, the ultrasound gel is more likely to be pushed out by the conventional device. Thus, sonographers have to reapply gel during conventional imaging procedures. The gutters 324, 326 provide a wall to keep the ultrasound gel within the scan area. Maintaining more ultrasound gel between the acoustic window 202 and the patient's skin advantageously improves image quality because the ultrasound gel is acoustic impedance-matched to facilitate transmission and reception of ultrasound signals. The scan time during imaging procedure is also advantageously reduced because sonographers are less likely to have to reapply ultrasound gel for the patient.

The perimeter 209 of the acoustic window 202 surrounds the distalmost end surface 207. The perimeter 209 can have a generally rectangular profile (FIG. 3) with rounded corners. The perimeter 209 can include a radiused edge 314 that is adjacent to the distalmost end surface 207 and a lateral surface 312 that is adjacent to the edge 314. The perimeter 209 extends from the end surface 207 to form the continuous distalmost end surface 207 and side surfaces of the ultrasound probe 108. In that regard, the radiused edge 314 and/or the lateral surface 312, together with the distalmost end surface 207, can form the compound shape of the acoustic window 202. For example, the radiused edge may be a curved section and the lateral surface 312 can be a straight section. As shown in FIG. 5, for example, the edge 314 has a radius of curvature 504. In some embodiments, the radius 504 can be between approximately 0.50 mm and approximately 1 mm, including values such as 0.50 mm, 0.75 mm, and/other suitable values both larger and smaller. In some instances, the radius 504 is greater than or equal to 0.50 mm, which allows for at least a minimum amount of curvature for patient comfort and manufacturability. The maximum allowable radius can be an optimization of the desired footprint and thickness of the part (e.g., the acoustic window 202). In some instances, the part thickness and, thus, the radius 504 can depend on the application, such as the anatomy being imaged by the ultrasound probe 108. Because the edge 314 is part of the acoustic window 202, the compliant material forming the edge 314 is softer than edges in conventional devices formed of hard plastic. This advantageously improves patient comfort. In that regard, the acoustic window 202 avoids a harder and sharper edge that can uncomfortably extend into to the skin of the patient during imaging. Rather, the edge 314 provides a softer and larger curve that is gentler when in contact with the patient's skin. As shown in FIGS. 4-7, the lateral surface 312 of the perimeter 209 extends at an oblique angle relative to, e.g., the distal end 205 of the housing 110, which can extend at 0° horizontally.

As shown in FIGS. 4-7, the acoustic window 202 includes a proximal edge 402 adjacent to the lateral surface 312. The proximal edge 402 is spaced from the distal end 205 of the housing 110. The edge 402 can be referenced as a fillet edge in some embodiments. A space 404 between the edge 402 and the distal end 205 is filled with the filler material 208 (FIG. 2).

The components of the ultrasound probe 108, such as the acoustic window 202 and/or the housing 110 can be manufactured using any suitable process. No limitation to any particular manufacturing process or technology is intended or should be implied from present disclosure.

Persons skilled in the art will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. An ultrasound probe, comprising:
 a housing configured to be grasped by a user and comprising a distal end extending zero degrees horizontally;
 a transducer array coupled to the housing and configured to obtain ultrasound data; and
 an acoustic window disposed over the transducer array and configured to contact a subject,
 wherein the acoustic window comprises an end surface, a first radiused edge, a second radiused edge, a first side-facing planar surface, and a second side-facing planar surface,
 wherein the end surface comprises a compound shape including:
 a curved section;
 a first planar section disposed on a first side of the curved section; and
 a second planar section disposed on a second side of the curved section opposite the first side,
 wherein an entirety of the end surface of the acoustic window is distal-facing such that the curved section, the first planar section, and the second planar section are distal-facing, and
 wherein the first planar section and the second planar section comprise a first oblique angle relative to the distal end of the housing such that:
 the first planar section is configured to be positioned against to a first rib of the subject;
 the second planar section is configured to be positioned against a second rib of the subject that is adjacent to the first rib, and the curved section is configured to be positioned against tissue of the subject that is between the first rib and the second rib, wherein the first side-facing planar surface and the second side-facing planar surface comprise a larger, second oblique angle relative to the distal end of the housing, wherein the first radiused edge is located between the first side-facing planar surface and the first planar section such that:
the first radiused edge is located inward of the first side-facing planar surface; and
the first planar section is located inward of the first radiused edge;

wherein the second radiused edge is located between the second side-facing planar surface and the second planar section such that:
the second radiused edge is located inward of the second side-facing planar surface; and
the second planar section is located inward of the second radiused edge.

2. The ultrasound probe of claim 1, wherein the curved section is convex.

3. The ultrasound probe of claim 1, wherein:
the end surface comprises an x dimension and a y dimension that is perpendicular to the x dimension;
the y dimension is larger than the x dimension; and
the curved section, the first planar section, and the second planar section extend longitudinally along the y dimension.

4. The ultrasound probe of claim 3,
wherein the curved section is curved along the y dimension,
wherein the first planar section extends along the x dimension and the y dimension such that the first planar section is wider than the first radiused edge, and
wherein the second planar section extends along the x dimension and the y dimension such that the second planar section is wider than the second radiused edge.

5. The ultrasound probe of claim 1, wherein the acoustic window comprises one or more gutters configured to hold ultrasound gel.

6. The ultrasound probe of claim 5,
wherein a curvature of the end surface is smooth:
at a first transition between the curved section and the first planar section; and
at a second transition between the curved section and the second planar section,
wherein the one or more gutters comprise:
a first gutter comprising the first transition; and
a second gutter comprising the second transition.

7. The ultrasound probe of claim 6, wherein the first transition and the second transition are concave.

8. The ultrasound probe of claim 1, wherein the curved section, the first planar section, and the second planar section are configured to contact the subject.

9. The ultrasound probe of claim 1, wherein the acoustic window comprises a perimeter surrounding the end surface.

10. The ultrasound probe of claim 9, wherein the perimeter comprises the first radiused edge and the second radiused edge.

11. The ultrasound probe of claim 10, wherein the perimeter comprises the first side-facing planar surface and the second side-facing planar surface.

12. The ultrasound probe of claim 1, wherein the acoustic window comprises a rectangular profile.

13. The ultrasound probe of claim 1,
wherein the transducer array overlaps the curved section, the first planar section, and the second planar section, and
wherein the transducer array comprises a two-dimensional, matrix array.

14. The ultrasound probe of claim 1,
wherein the housing comprises a distal portion and a proximal portion,
wherein the distal portion comprises a bulbous shape defining a ledge against which a hand of the user is positioned when grasping the proximal portion.

15. The ultrasound probe of claim 1, wherein:
the housing comprises a first material; and
the acoustic window comprises a softer, second material.

16. A system, comprising:
the ultrasound probe of claim 1; and
a computer in communication with the ultrasound probe and configured to generate an ultrasound image based on the ultrasound data.

17. The ultrasound probe of claim 1,
wherein the first planar section and the second planar section comprise the first oblique angle in opposite directions, and
wherein the first side-facing planar surface and the second side-facing planar surface comprise the second oblique angle in opposite directions.

* * * * *